United States Patent
Iselborn et al.

(10) Patent No.: US 8,140,545 B2
(45) Date of Patent: Mar. 20, 2012

(54) DATA ORGANIZATION AND EVALUATION USING A TWO-TOPOLOGY CONFIGURATION

(75) Inventors: Bernhard G. Iselborn, Sinsheim (DE); Norbert Wex, Walldorf (DE)

(73) Assignee: SAP AG, Walldorf (DE)

( * ) Notice: Subject to any disclaimer, the term of this patent is extended or adjusted under 35 U.S.C. 154(b) by 1117 days.

(21) Appl. No.: 11/648,436

(22) Filed: Dec. 28, 2006

(65) Prior Publication Data

US 2008/0159317 A1    Jul. 3, 2008

(51) Int. Cl.
   *G06F 7/00*    (2006.01)
   *G06F 17/30*    (2006.01)
   *G06F 9/44*    (2006.01)

(52) U.S. Cl. ........... 707/752; 717/12; 717/122; 717/170

(58) Field of Classification Search ................... 707/752
   See application file for complete search history.

(56) References Cited

U.S. PATENT DOCUMENTS

| | | | | |
|---|---|---|---|---|
| 5,787,280 A | * | 7/1998 | Joseph et al. | 717/170 |
| 6,112,024 A | * | 8/2000 | Almond et al. | 717/122 |
| 6,272,678 B1 | * | 8/2001 | Imachi et al. | 717/122 |
| 6,584,476 B1 | * | 6/2003 | Chatterjee et al. | 1/1 |
| 7,266,805 B2 | * | 9/2007 | Weidman et al. | 717/101 |
| 7,627,615 B2 | * | 12/2009 | McMahon | 1/1 |
| 2005/0022156 A1 | | 1/2005 | Schwan et al. | |

* cited by examiner

*Primary Examiner* — Angela Lie
*Assistant Examiner* — Kris Mackes
(74) *Attorney, Agent, or Firm* — Fish & Richardson P.C.

(57) ABSTRACT

A computer-implemented method for organizing data in a two-topology configuration is disclosed. The method includes providing a plurality of nodes, each node including data relating to a corresponding object state, and linking each of at least one of the plurality of nodes to one or more associated sub-nodes that each include data relating to one of a plurality of modifiable parameters representative of changes to the corresponding object state data such that all sub-nodes relating to a particular modifiable parameter of the corresponding object state data are arranged along a corresponding single branch of linked sub-nodes extending from the associated node.

20 Claims, 4 Drawing Sheets

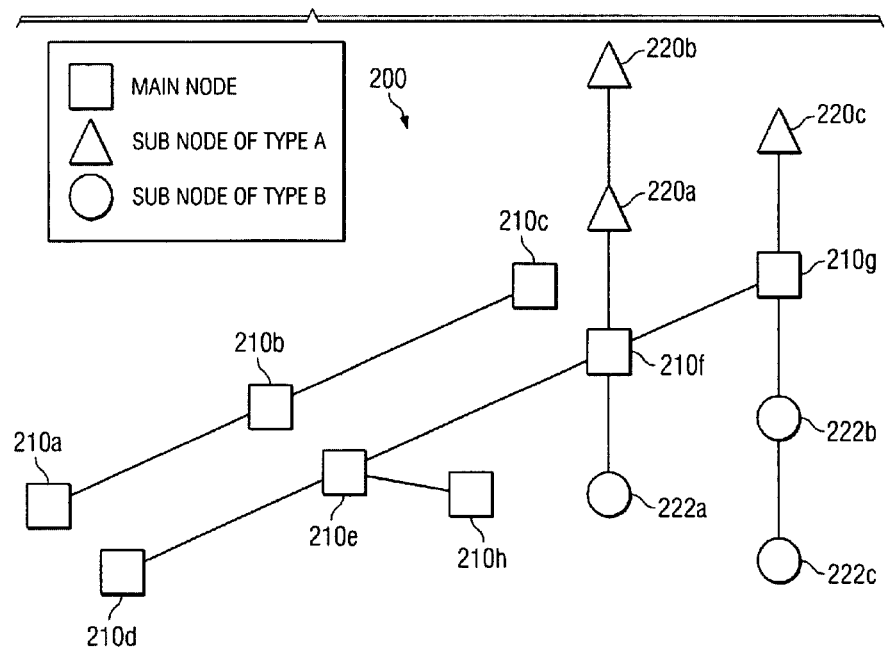
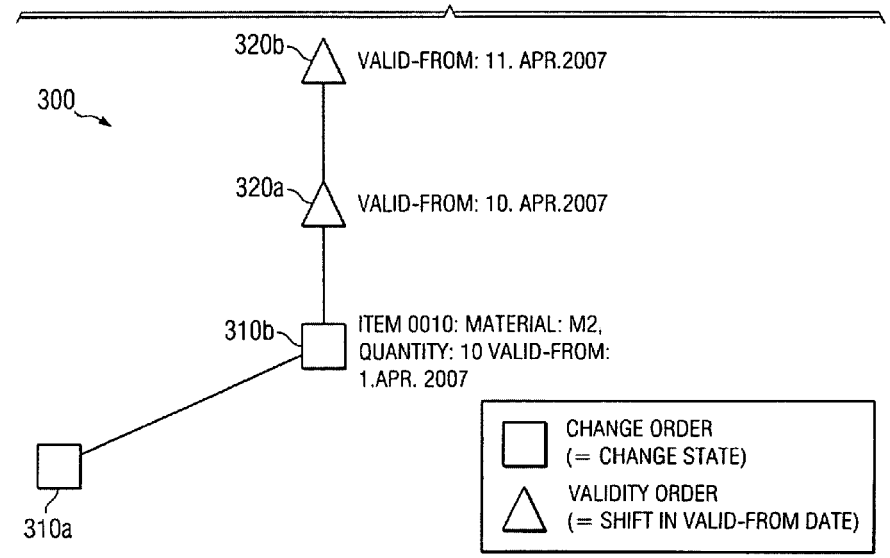

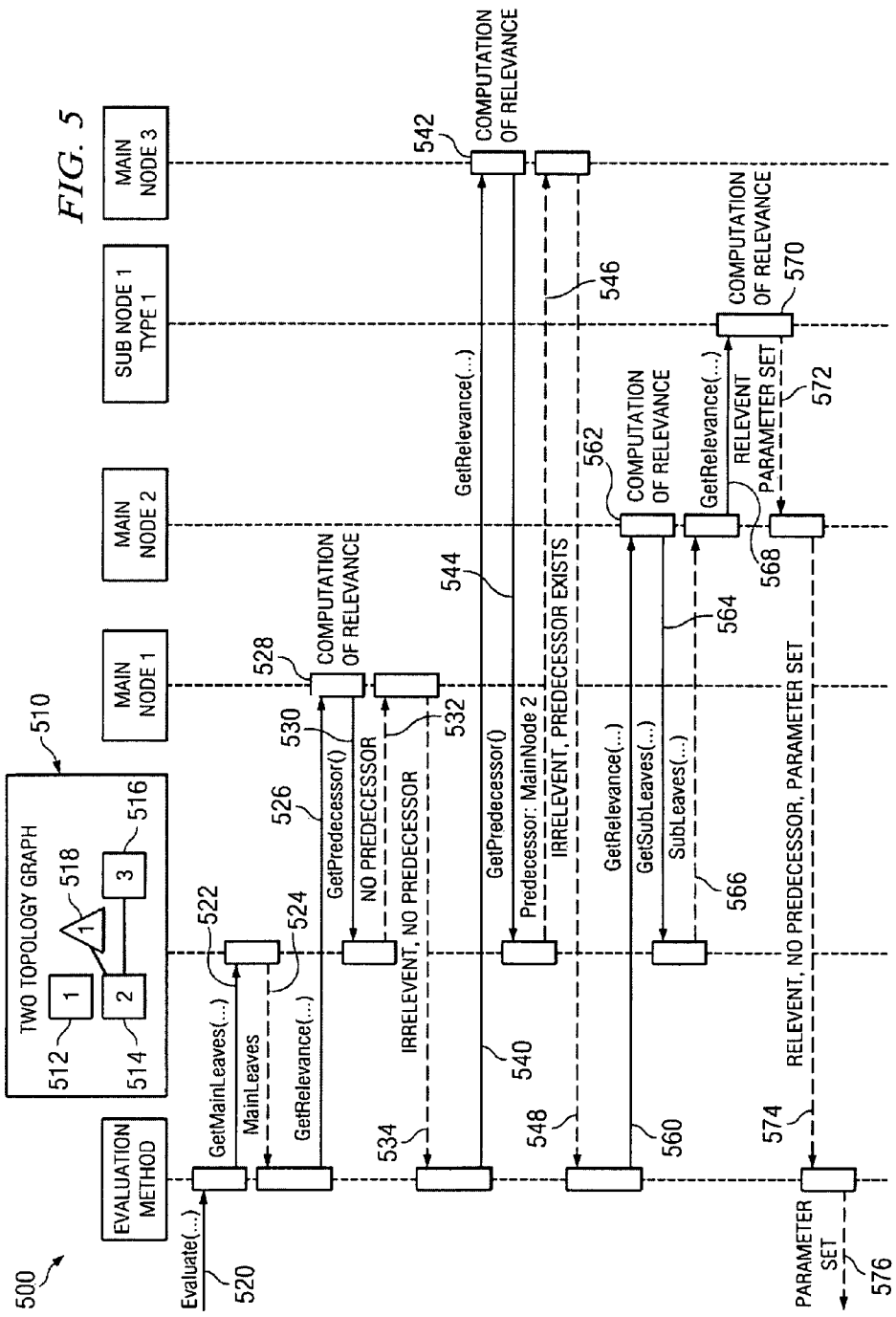

DATA ORGANIZATION AND EVALUATION USING A TWO-TOPOLOGY CONFIGURATION

TECHNICAL FIELD

This invention relates to data organization and, in particular, to data organization using two-topology configurations.

BACKGROUND

In business and engineering environments, as well as in other fields, data pertaining to the development and administration of projects can be voluminous and difficult to manage. Typical projects and endeavors can involve many different development stages that having many different facets. For example, the development project of a particular product can include the parallel development of different components of the product by different teams. Additionally, different aspects of a project can proceed independently and/or simultaneously. Even with respect to the ongoing efforts of individual aspects of a project, there can be multiple stages, milestones, revisions, etc. Thus, controlling and/or managing such projects can be cumbersome.

Data pertaining to different developmental aspects and phases can be recorded and maintained as a collection of data records that include, for example, data that describe tasks that are to be completed (or that have already been completed), data about product components, managerial structures and/or any other data that is germane to the project. Such data records can be viewed as objects. Data relating to particular objects changes over time, and it often becomes necessary to record the changed data while still preserving the original data record. A change to object data can be viewed as a new state of the object, with the collection of states reflecting some historical evolution with respect to the object. The sum total of the available data (e.g., the various states of objects) is subsequently processed to enable, for example, an evaluation of the different object states to extract useful information, such as the status of the project at some point (or points) in time (e.g., what parts of the project will be completed).

SUMMARY

In one aspect, a computer-implemented method for organizing data in a two-topology configuration is disclosed. The method includes providing a plurality of nodes, with each of at least a subset of the nodes including data relating to a corresponding object state. The method can further include linking at least one of the plurality of nodes to one or more associated sub-nodes that each include data relating to one of a plurality of modifiable parameters representative of changes to the corresponding object state data such that all sub-nodes relating to a particular modifiable parameter of the corresponding object state data are arranged along a corresponding single branch of linked sub-nodes extending from the associated node.

In some implementations, many sub-nodes may be linked to its predecessor element and at most to one successor sub-node. The predecessor element may include, for example, a predecessor node or a predecessor sub-node. Also, the plurality of modifiable parameters may include, for example, the date at which the object state becomes valid and/or an indication of whether a validation check performed on the object state was successful. In further implementations, each leaf sub-node located at the far end of the corresponding branch may include data relating to the most recent modification to the corresponding modifiable parameter of the corresponding object state data. The method may also include providing a set of one or more specified evaluation parameters, and determining the relevancy of at least some of the plurality of nodes based, at least in part, on the set of the one or more specified evaluation parameters.

Determining the relevancy of at least some of the plurality of nodes may include at each of the at least some of the plurality of nodes linked to sub-nodes, accessing at least some of the sub-nodes arranged along the branches associated with the corresponding node, and evaluating the relevancy of the at least some of the plurality of nodes linked to sub-nodes based, at least in part, on the set of the one or more specified evaluation parameters and on the data held in the accessed sub-nodes associated with the corresponding node. Determining the relevancy of at least some of the plurality of nodes may include, based on a determination that a currently accessed node has a predecessor node linked to it, accessing the predecessor node.

In another aspect, a computer-implemented method for evaluating the relevancy of at least some of a plurality of nodes is disclosed. The method includes providing a set of one or more specified evaluation parameters. The method may also include accessing each of at least some of the plurality of nodes, with each one of the plurality of nodes including data relating to a corresponding object state and at least one of the plurality of nodes linked to one or more associated sub-nodes that each include data relating to one of a plurality of modifiable parameters representative of changes to the corresponding object state data such that all sub-nodes relating to a particular modifiable parameter of the corresponding object state data are arranged along a corresponding single branch of linked sub-nodes extending from the associated node. The method also includes determining the relevancy of the at least some of the plurality of nodes based, at least in part, on the set of the one or more specified evaluation parameters.

Each of the foregoing—as well as other disclosed—example methods may be computer implementable. Moreover, some or all of these aspects may be further included in respective systems and software for organizing, utilizing, traversing, or otherwise managing data in a two-topology configuration. The details of these and other aspects and embodiments of the disclosure are set forth in the accompanying drawings and the description below. Features, objects, and advantages of the various embodiments will be apparent from the description and drawings, and from the claims.

DESCRIPTION OF THE DRAWINGS

FIG. 2 is an exemplary embodiment of a two-topology graph;

FIG. 3, showing another exemplary embodiment of a two-topology graph;

FIG. 5 is a flow diagram of an exemplary embodiment of a sequence of operations to process and evaluate data organized in a two-topology configuration.

DETAILED DESCRIPTION

Figure 1:
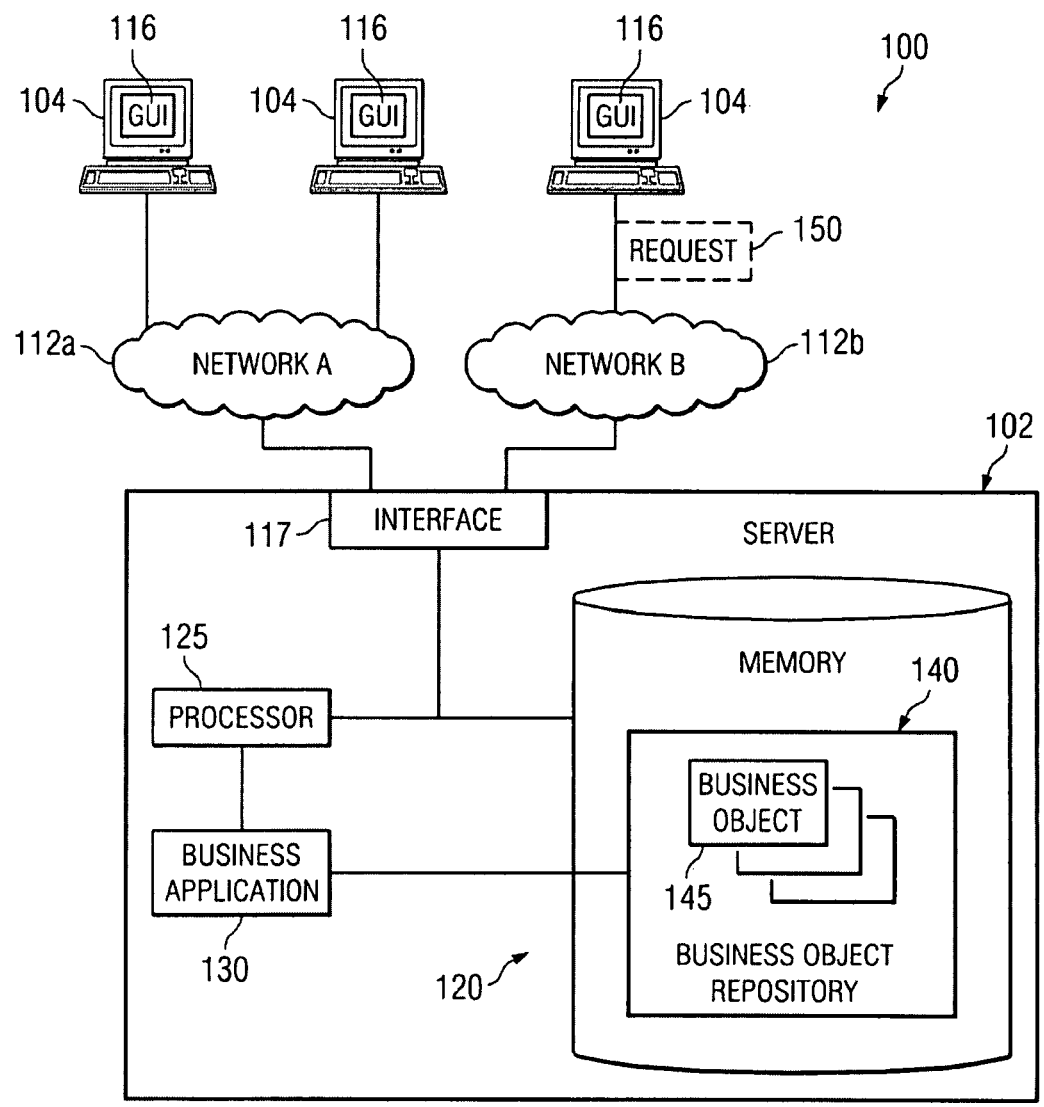
FIG. 1 is a schematic diagram of an exemplary embodiment of a generic server system adapted to organize data in a two-topology configuration.

FIG. 1 illustrates a data processing environment or system 100 for storing or retrieving (or otherwise managing) information in at least a portion of an enterprise in accordance with a particular implementation of a system and method implementing, managing, or otherwise processing two-topology configurations. For example, the system 100 is configured to define and/or provide node elements that include data relating to corresponding object states, and to link to at least some of those node elements one or more associated sub-node elements that include data relating to modifiable parameters of the respective business object states. At least some of the node and sub-node elements provided on the system 100 are arranged in a two-topology configuration such that sub-nodes pertaining to a particular modifiable parameter (e.g., the date at which the state object at the associated node becomes valid) are arranged along a single branch of sub-nodes extending from the associated node element. The term "two-topology" generally refers to the arrangement of data using main nodes, representing one dimension of the topology, and associated sub-nodes, representing a second dimension of the topology, where the sub-nodes extend from their associated main nodes. Use of two-topology configurations to organize data often enables different semantics within each topology and, therefore, would enable the formation of individual contexts (e.g., using sub-nodes) per business object instance. This may result in, for example, a clear separation between different states (or versions) and their parameter changes. It is to be noted that such a separation is not limited to separating between states/version and parameter changes. Use of the two-topology configuration to organize data also provides a flexible, integrated and extensible organization of data that facilitates processing and evaluation of data to search and identify relevant data.

Environment 100 may be a distributed client/server system that allows clients 104 to submit requests to store and/or retrieve information from business object repository 145 maintained within memory 120 on server 102. But environment 100 may also be a standalone computing environment or any other suitable environment, such as an administrator accessing data stored on server 102, without departing from the scope of this disclosure. Environment 100 may allow access to individual business objects 145 within the business object repository 140 using access methods such as Java, Component Object Model/Distributed Component Object Model (COM/DCOM), Common Object Request Broker Architecture (CORBA), Remote Function Call (RFC), and Hypertext Transfer Protocol (HTTP), or other suitable access methods.

In the illustrated embodiment, server 102 includes memory 120 and processor 125 and comprises an electronic computing device operable to receive, transmit, process and store data associated with environment 100. For example, server 102 may be any computer or processing device such as a mainframe, a blade server, general-purpose personal computer (PC), Macintosh, workstation, Unix-based computer, or any other suitable device. Generally, FIG. 1 provides merely one example of computers that may be used with the disclosure. In other words, the present disclosure contemplates computers other than general purpose computers, as well as computers without conventional operating systems. As used in this document, the term "computer" is intended to encompass a personal computer, workstation, network computer, or any other suitable processing device. For example, although FIG. 1 illustrates one server 102 that may be used with the disclosure, environment 100 can be implemented using computers other than servers, as well as a server pool. Server 102 may be adapted to execute any operating system 110 including z/OS, Linux-Intel or Linux/390, UNIX, Windows Server, or any other suitable operating system. According to one embodiment, server 102 may also include or be communicably coupled with a web server and/or an SMTP server.

Memory 120 may include any memory or database module and may take the form of volatile or non-volatile memory including, without limitation, magnetic media, optical media, random access memory (RAM), read-only memory (ROM), removable media, or any other suitable local or remote memory component. In this embodiment, illustrated memory 120 includes business object repository 140. In some embodiments, the business object repository 140 may be stored in one or more tables in a relational database described in terms of SQL statements or scripts. In the same or other embodiments, the business object repository 140 may also be formatted, stored, or defined as various data structures in text files, eXtensible Markup Language ("XML") documents, Virtual Storage Access Method ("VSAM") files, flat files, Btrieve files, comma-separated-value ("CSV") files, internal variables, or one or more libraries. In short, the business object repository 140 may comprise one table or file or a plurality of tables or files stored on one computer or across a plurality of computers in any appropriate format. Indeed, some or all of the business object repository 140 may be local or remote without departing from the scope of this disclosure and store any type of appropriate data. In particular embodiments, the business object repository 140 may access the business objects 145 in response to queries from clients 104.

These business objects 145 may represent organized data relating to some project or endeavor, which may or may not be linked, with each object having one or more states related to the object. Each of the states, in turn, is associated with data that pertains to various modifiable parameters of the individual states of the object. One type of data modeling that includes multiple objects with each having multiple states, and each state having multiple instances of changes to the state's modifiable parameters, is the business object model. Briefly, the overall structure of a business object model ensures the consistency of the interfaces that are derived from the business object model. The business object model defines the business-related concepts at a central location for a number of business transactions. In other words, it reflects the decisions made about modeling the business entities of the real world acting in business transactions across industries and business areas. The business object model is defined by the business objects and their relationship to each other (the overall net structure).

Business object 145 is thus a capsule with an internal hierarchical structure, behavior offered by its operations, and integrity constraints. Business objects 145 are generally semantically disjointed, i.e., the same business information is represented once. In some embodiments, the business objects are arranged in an ordering framework. From left to right, they are arranged according to their existence dependency to each other. For example, the customizing elements may be arranged on the left side of the business object model, the strategic elements may be arranged in the center of the business object model, and the operative elements may be arranged on the right side of the business object model. Similarly, the business objects are arranged from the top to the bottom based on defined order of the business areas, e.g., finance could be arranged at the top of the business object model with CRM below finance and SRM below CRM. To ensure the consistency of interfaces, the business object model may be built using standardized data types as well as packages to group related elements together, and package templates and entity templates to specify the arrangement of packages and entities within the structure.

A particular type of business object 145 is a purchase order. The states associated with this object can include, for example, an "open" state, an "approved" state, a "paid" state, etc. Any one of these states thus constitutes a different object state. In this example, a modifiable parameter of the various object states could be an "effective date" parameter that indicates the data from which the object state will become (or has already become) effective. This parameter can be viewed as a condition of the state.

In another example, business object 145, pertaining to a development project for some product, is the Engineering Change Order object, which specifies changes that are to be made to some other business objects. This business object 145 includes states that each have data regarding changes to the states of individual objects (different from the Engineering Change Order object). These different example states, corresponding to the Engineering Change Order object, may include a modifiable "validation" parameter which may be intermittently changed. A validation parameter indicates whether a particular change order has been allowed and/or when the validation will become effective. The Engineering Change Order Object provides, in effect, an historical document representing an audit trail of various implemented changes, and is sometimes referred to as "Change Configuration Management."

Another type of project data that can be modeled as a collection of multiple objects, each having multiple states, with each state having multiple modifiable parameters, is data relating to an engineering project or process. For example, various objects may correspond to different items, parts, products and/or documents associated with the project. One object, then, could be for a particular item, with each state of the object representing a change to the dimensions and/or materials of the item. A modifiable parameter could be the "valid-from" parameter which specifies the date from which the indicated change in the state will take effect. In one embodiment, business object repository 140 may be referenced by or communicably coupled with applications executing on or presented to client 104. In some embodiments, the business object repository 140 may be searchable, such as by requests 150 from clients 104 via the network 112. Distinct business objects 145, as well as multiple instances of a single business object 145, may be searched to allow the user and/or application to find a business object 145 type or a specific instance thereof on demand.

Server 102 also includes processor 125. Processor 125 executes instructions and manipulates data to perform the operations of server 102 such as, for example, a central processing unit (CPU), a blade, an application specific integrated circuit (ASIC), or a field-programmable gate array (FPGA). In particular, processor 125 performs any suitable tasks associated with business object repository 140. Although FIG. 1 illustrates a single processor 125 in server 102, multiple processors 125 may be used according to particular needs and reference to processor 125 is meant to include multiple processors 125 where applicable.

Server 102 may also include interface 117 for communicating with other computer systems, such as client 104, over network 112 in a client-server or other distributed environment. In certain embodiments, server 102 receives requests 150 for data access from local or remote senders through interface 117 for storage in memory 120 and/or processing by processor 125. Generally, interface 117 comprises logic encoded in software and/or hardware in a suitable combination and operable to communicate with network 112. More specifically, interface 117 may comprise software supporting one or more communications protocols associated with communications network 112 or hardware operable to communicate physical signals.

Server 102 may also include or reference a local, distributed, or hosted business application 130. In certain embodiments, business application 130 may request access to retrieve, modify, delete, or otherwise manage the information of the business object repository 140 in memory 120. Specifically, business application 130 may access the business object repository 140 to retrieve or modify data stored within specific business objects 145 as requested by a user and/or application. Business application 130 may be considered a business software or solution that is capable of interacting or integrating with business object repository 140 located, for example, in memory 120 to provide access to data for personal or business use. An example business application 130 may be a computer application for performing any suitable business process by implementing or executing a plurality of steps. One example of a business application 130 is an application that may provide interconnectivity with one or more business object repositories 140 containing product development information such that records may be dispersed among a plurality of business objects 145. As a result, business application 130 may provide a method of accessing requested data and presenting it to the user and/or application such that the user and/or application are provided information through a GUI interface 116 in a centralized manner. Business application 130 may also provide the user with a computer implementable method of implementing a centralized source for agreements on one or more solutions identified by a solution provider. The business application 130 is typically software and may be written or described in any appropriate computer language including, for example, C, C++, Java, Visual Basic, assembler, Perl, ABAP, any suitable version of 4GL, or any combination thereof. As used herein, software generally includes any appropriate combination of software, firmware, hardware, and/or other logic. It will be understood that while business application 130 is illustrated in FIG. 1 as a single multi-tasked module, the features and functionality performed by the repository may be performed by multiple modules such as, for example, one or more agents or database instances. Further, while illustrated as internal to server 102, one or more processes associated with the business application 130 may be stored, referenced, or executed remotely. Moreover, the business application 130 may be a child or sub-module of another software module (such as a parent database) without departing from the scope of this disclosure.

Network 112 facilitates wireless or wireline communication between computer server 102 and any other local or remote computer, such as clients 104. Indeed, while illustrated as two networks, 112a and 112b respectively, network 112 may be a continuous network without departing from the scope of this disclosure, so long as at least portion of network 112 may facilitate communications between senders and recipients of requests 150 and results. In other words, network 112 encompasses any internal and/or external network, networks, sub-network, or combination thereof operable to facilitate communications between various computing components in environment 100. Network 112 may communicate, for example, Internet Protocol (IP) packets, Frame Relay frames, Asynchronous Transfer Mode (ATM) cells, voice, video, data, and other suitable information between network addresses. Network 112 may include one or more local area networks (LANs), radio access networks (RANs), metropolitan area networks (MANs), wide area networks (WANs), all or a portion of the global computer network known as the Internet, and/or any other communication system or systems at one or more locations.

Client 104 is any local or remote computing device operable to receive requests from the user via a user interface 116, such as a GUI, a Command Line Interface (CLI), or any of numerous other user interfaces. Thus, where reference is made to a particular interface, it should be understood that any other user interface may be substituted in its place. In various embodiments, each client 104 includes at least GUI 116 and comprises an electronic computing device operable to receive, transmit, process and store any appropriate data associated with environment 100. It will be understood that there may be any number of clients 104 communicably coupled to server 102. For example, illustrated clients 104 may include one local client 104 and two clients external to the illustrated portion of enterprise 100. Further, "client 104" and "user" may be used interchangeably as appropriate without departing from the scope of this disclosure. Moreover, for ease of illustration, each client 104 is described in terms of being used by one user. But this disclosure contemplates that many users may use one computer or that one user may use multiple computers to submit or review queries via GUI 116. As used in this disclosure, client 104 is intended to encompass a personal computer, touch screen terminal, workstation, network computer, kiosk, wireless data port, wireless or wireline phone, personal data assistant (PDA), one or more processors within these or other devices, or any other suitable processing device. For example, client 104 may comprise a computer that includes an input device, such as a keypad, touch screen, mouse, or other device that can accept information, and an output device that conveys information associated with the operation of server 102 or clients 104, including digital data, visual information, or GUI 116. Both the input device and output device may include fixed or removable storage media such as a magnetic computer disk, CD-ROM, or other suitable media to both receive input from and provide output to users of clients 104 through the display, namely GUI 116.

GUI 116 comprises a graphical user interface operable to allow the user of client 104 to interface with at least a portion of environment 100 for any suitable purpose. Generally, GUI 116 provides the user of client 104 with an efficient and user-friendly presentation of data provided by or communicated within environment 100. GUI 116 may provide access to the front-end of business application 130 executing on client 104 that is operable to access one or more business objects 145 stored within business object repository 140. In another example, GUI 116 may display output reports such as summary and detailed reports. GUI 116 may comprise a plurality of customizable frames or views having interactive fields, pull-down lists, and buttons operated by the user. In one embodiment, GUI 116 presents information associated with queries 150 and buttons and receives commands from the user of client 104 via one of the input devices. Moreover, it should be understood that the term graphical user interface may be used in the singular or in the plural to describe one or more graphical user interfaces and each of the displays of a particular graphical user interface. Therefore, GUI 116 contemplates any graphical user interface, such as a generic web browser or touch screen, that processes information in environment 100 and efficiently presents the results to the user. Server 102 can accept data from client 104 via the web browser (e.g., Microsoft Internet Explorer or Mozilla Firefox) and return the appropriate HTML or XML responses using network 112. For example, server 102 may receive a request 150 from client 104 using the web browser and then execute the request 150 to store and/or retrieve information and data from a business object 145 stored within business object repository 140.

With reference to FIG. 2, a schematic diagram of an exemplary embodiment of a two-topology graph 200 representative of a data organization configuration is shown according to which object state data and data pertaining to changes made with respect to parameters of object states can be arranged. For example, for data pertaining to a development project, different object states could correspond to different item parts, changes made to item parts, requisition orders, etc. The modifiable parameters associated with the objects states could include information indicating when an object state comes into effect (e.g., when a proposed change to the design of the product is to be implemented), information indicating when a validation check performed on a particular object state has been successful, etc.

As shown in FIG. 2, data organized in a structure conforming to the two-topology configuration includes main nodes such as 210$a$-$h$ and different types of sub-nodes, such as 220$a$-$c$ and 222$a$-$c$ (i.e., each of 220$a$-$c$ corresponds to one type of sub-nodes, and each of 222$a$-$c$ corresponds to another type of sub-nodes). Generally, main nodes can have one predecessor node and/or any number of successor nodes linked thereto. Thus, for example, node 210$e$ is linked to both node 210$f$ and 210$h$. The linking of nodes facilitates traversal and access of the multiple main nodes to enable efficient searching and processing of the data maintained at the nodes, as will become apparent below. As can also be seen, some nodes may be interlinked to some other nodes, but not necessarily to all nodes, thus defining groups of interlinked nodes. In the exemplary embodiments of FIG. 2, main nodes 210$a$-$c$ define one group of interlinked main nodes, whereas nodes 210$d$-$h$ define another group of main nodes. As shown, the main nodes are grouped in two separate linked node clusters, with one cluster (or group) including nodes 210$a$-$c$, and the other group including nodes 210$d$-$h$. Each of these groups may correspond to different objects, with each node in that group representing a state (e.g., representative of a change) of the associated object.

Main nodes that are linked form main node branches, with the main nodes that are located at the far ends of the main node branches (i.e., the main nodes having no successors) constituting the leaves of the main node branches. Thus, for example, node 210$g$ is a leaf main node of the main node branch formed by linked main nodes 210$d$, 210$e$, 210$f$, and 210$g$.

In some embodiments, one of the nodes in each of the node clusters is a root node, representing the base data pertaining to the object, while the other linked nodes contain data corresponding, for example, to changes that occur in reference to the root node. For example, in some embodiments, the left most node shown in a two-topology graph representation corresponds to the root node. Thus, for example, in the graph shown in FIG. 2, nodes 210$a$ and 210$d$ may be the respective root nodes of the two node clusters shown in the figure.

In some embodiments, nodes can be dynamically generated during run-time by allocating memory space to hold the data corresponding to the particular object state. The nodes can hold data having different types of data structures and/or content.

As further shown in FIG. 2, at least some of the object state nodes are linked to sub-nodes that include data relating to changes that have been made to modifiable parameters of the object state to which these sub-nodes are linked. These sub-nodes thus represent a second dimension or level of data (e.g., data that is generally more intimately related to a specific individual object state) which may be represented on the graph as a second type of sub-structure (e.g., a branch) spawned off from the first main structure of the object. Thus, sub-nodes 220a-c and 222a-c are sub-nodes extending from two nodes of the lower node cluster (as explained, the lower node cluster may represent one particular object whose different states are represented by the multiple nodes in the cluster). Each modifiable parameter corresponds to a certain sub-node type. Every object state may have multiple modifiable parameters (the number may depend on the particular definition of the object), and thus may have multiple types of sub-nodes, corresponding to those modifiable parameters, extending from the object state. For example, sub-nodes 220a-c could correspond to one type of modifiable parameter (e.g., the "effective from date") while sub-nodes 222a-c could correspond to a different type of a modifiable parameter (e.g., "validation" status).

As further shown in FIG. 2, every sub-node can only have one predecessor, which may be a main node (as in the case of example sub-nodes 220a, 220c, 222a, and 222b), or it may be another sub-node (as in the case of 220b and 222c). Every sub-node extending from its associated main node defines a branch of sub-nodes (which may include only that one single sub-node). As can be seen, all sub-nodes in a particular branch extending from a certain main node are of the same type. Where a branch includes several sub-nodes reflecting a sequence of changes to a particular modifiable parameter of the object state, the outer most sub-node in the branch (the so-called "leaf" sub-node) will generally indicate the most up-to-date parameter in relation to the linked main node. In some cases, the sub-node can have at most a single successor. For example, the successor of sub-node 222b is sub-node 222c. However, sub-nodes need not have any successors (as shown for example sub-nodes 220b, 220c, 222a, and 222c).

As noted, in some embodiments, the sub-nodes represent instances of change to modifiable parameters. However, a sub-node will generally be formed in instances in which modifiable parameters changed but not some of the other parameters and/or attributes. Thus, for example, in situations where a state change occurred (e.g., there was some significant change to an attribute of the object), a main node, representative of a state change, will be formed rather than a sub-node.

FIG. 3 is another example embodiment of a two-topology graph 300 representative of a configuration for organizing data for an object corresponding to a bill of materials (that may be used in engineering change management). As shown, the object's first state is represented by the main node 310a (this node may be the root node of the object). The node 310a includes data indicating the material (M1) and quantity (5) that is to be used with respect to item 0010. The "valid-from" parameter for the data of the object state in the node 310a indicates that this material and specifications are valid from Mar. 1, 2007. Linked to main node 310a is the main node 310b that corresponds to an object state in which the specified material for item 0010 changed to M2, and the quantity changed to 10. Because the change with respect to item 0010 is one that was directed to the material and quantity, which are changes representing an object state change, a new node is provided (namely, node 310b) to represent and hold the data corresponding to this state change. The main node 310b is formed notwithstanding that the "valid-from" parameter also changed (namely, to a date of Apr. 1, 2007).

However, when the modifiable parameter for the node 310b changes from Apr. 1, 2007, to Apr. 10, 2007, that change does not cause the formation of a main node, but instead sub-node 320a is formed to capture the information relating to this change. In some implementations, sub-node 320a may only be linked to a single predecessor (in this case, node 310b), and reflects changes to the modifiable parameter only with respect to the main node from which it extends. The formed sub-node is of a type that represents a change to the "valid-from" parameter. Had another modifiable parameter of the object state of node 310b changed, that change would have resulted, in some cases, in the formation of a different type of sub-node (i.e., one specifically associated with that modifiable parameter).

Subsequently, another change to the validity order with respect to the object state in node 310 takes place and the valid-from date changes from Apr. 10, 2007, to Apr. 11, 2007. To capture this change and arrange the data in the data organization structure used for the object, another sub-node of the type associated with changes to the "valid-from" parameter, namely sub-node 320b, is formed, and is linked to sub-node 320a.

Because the sub-nodes are only associated and linked to a single main node, it is generally not necessary to include with the sub-node additional data because all other information relating to the object state can be extracted by accessing the main node associated with the sub-node and/or retrieving information recorded in the other sub-nodes extending from the associated main node. Such an organization of data, therefore, enables efficient maintenance of data, as well as efficient retrieval and processing of data stored with respect to objects.

Figure 4:
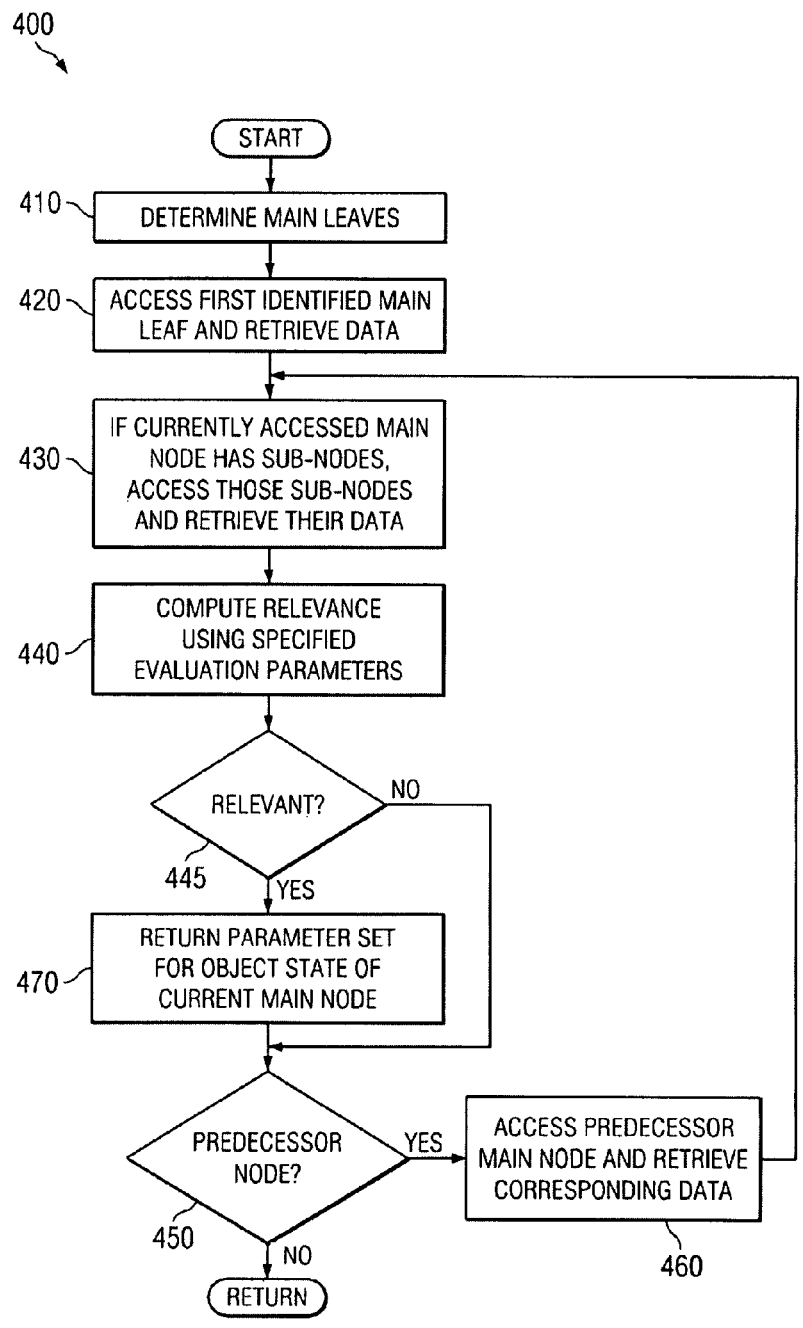
FIG. 4 is a flowchart of an exemplary embodiment of an evaluation procedure performed on data organized in a two-topology configuration.

FIG. 4 is a flowchart of an example embodiment of an evaluation procedure 400 performed in relation to data organized in a two-topology configuration, although other procedures for accessing, evaluating, and/or traversing data structures having two-topology configurations may be used. Generally, data organized in a two-topology configuration enables direct determination of a valid object state by first accessing the main leaves, which are the leaves on main node branches in the two-topology configuration (i.e., the main nodes not having any successor, such as, for example, main nodes 210g and 210h in FIG. 2). Thus, at step 410, the main leaves of a particular data structure organized in a two-topology configuration are determined.

The procedure 400 next accesses the first identified main leaf and retrieves the object state data held at the node at step 420. Furthermore, if the currently accessed main leaf is linked to sub-nodes extending from it, these sub-nodes have to be accessed to determine the current values of the modifiable parameters of the object state data that have changed subsequent to the formation of the currently accessed main node. Thus, at step 430, the sub-nodes of the currently accessed node, if any such sub-nodes exist, are accessed, and the current data, representative of changes to the data of the associated main node, is retrieved. In some embodiments, only the most current parameter values may be required, and accordingly, the leaf sub-nodes for the currently accessed node are retrieved and their corresponding data used in the overall evaluation of the currently accessed main node. Under these circumstances, any of the sub-node predecessors to the leaf sub-nodes (i.e., predecessors located on the corresponding sub-nodes branches) may be bypassed.

In some embodiments, it may be necessary to access and retrieve data from sub-nodes other the leaf sub-nodes. For example, a subnode may have a "release" status flag associated with it, to indicate which sub-nodes are to be taken into account. Thus, for example, a first released node of a particular type that was created prior to a second non-released sub-node of the same type will be the one to be taken into account notwithstanding that it is older than the second sub-node. Therefore, upon accessing the leaf sub-node (i.e., the second sub-node in this example), the second sub-node will in effect be skipped and the second sub-node's predecessor (i.e., the first sub-node) will be considered.

Having retrieved the data to be evaluated from the currently accessed node, and/or from any sub-nodes extending from the currently accessed nodes, the relevancy of the data is computed at step 440. The computation is generally based on a set of specified evaluation parameters or criteria. For example, if the objects being evaluated pertain to purchase order objects, a possible evaluation could be one that seeks to identify object states that have been approved during a particular time range (e.g., September to December of 2000). Thus, during the evaluation procedure, the pertinent data (in this example, the order's status) in each of the accessed main nodes is retrieved and compared to the specified evaluation parameters. Other types of evaluation parameters include serial numbers, batches, points in time, and so forth.

In some embodiments, computation of the relevancy is performed using the data of the main node. Subsequently, after the data of the associated sub-node has been retrieved, a follow-up relevancy computation is performed using the sub-nodes' data. In these embodiments, the follow-up relevancy computation may be used to override the relevancy computed using the main node's data.

In the event that a currently accessed main node is determined, at step 445, to be not relevant, or to hold only delta information (i.e., information regarding how the data changed with respect to the predecessor element, rather than actual data formatted similarly to the predecessor element), the evaluation procedure proceeds along the main node branches to access the predecessor main node of the just evaluated main node, and the procedure, at steps 430-440, is repeated with respect to the predecessor main node. Thus, at step 450, a determination is made of whether there is a predecessor main node, and if so, then at step 460 that predecessor main node is accessed and the corresponding object state data is retrieved. Procedure 400 then repeats steps 430-440.

In the event the accessed main node is determined to be relevant, the parameter set representative of the object state data is returned, at step 470, to the calling procedure, or is otherwise made available for further processing (e.g., reporting). In some circumstances, the data held in the currently accessed node is returned or made available for further processing.

In some embodiments, once the first relevant main node is identified, procedure 400 terminates. On the other hand, in some embodiments, procedure 400 seeks to identify all relevant nodes and, thus, in such embodiments, once the parameter set of the just identified relevant main node is returned, procedure 400 is directed to 450 to determine if there is a predecessor main node to the just evaluated main node. When a root node for a particular cluster of node has been reached, and there are no predecessor nodes to the just accessed main node, the next main leaf is accessed and procedure 400 can be repeated for that leaf.

To further illustrate the evaluation operation performed on data organized in a two-topology configuration, FIG. 5 shows an example flow diagram of a sequence of operations 500 to process and evaluate data organized in a particular two-topology structure 510. As shown, the two-topology structure 510 includes two clusters of nodes, one having a single main node 512, and another that includes two linked main nodes 514 and 516, and a sub-node 518 extending from main node 514.

The evaluation operations may be an exemplary implementation of the procedure 400 described herein or may be an implementation of some other embodiment of an evaluation procedure for two-topology configurations. As described above with reference to business application 130, the operations described in relation to FIG. 5 may be implemented using object-oriented high-level programming languages such as C++. However, other implementations for embodiments of evaluation procedures for two-topology configurations may also be used.

As shown, the evaluation process begins by invoking the procedure or function call Evaluate( . . . ) at 520. The procedure call Evaluate( . . . ) includes parameters that identify the particular structure that is to be accessed and evaluated to determine, for example, relevant main nodes. The Evaluate procedure call thus launches the evaluation procedure during which, as will be described below, procedure calls are invoked to perform operations that cause the nodes to be accessed and evaluated in a manner similar, for example, to that described in general terms in relation to procedure 400. In this case, the procedure call Evaluate( . . . ) includes a parameter that identifies the structure 510 as the two-topology structure in relation to which the Evaluate procedure is performed.

After calling the Evaluate( . . . ) procedure, a call to the GetMainLeaves( . . . ) procedure is made at 522. This procedure, when executed, determines the main node leaves of the structure 510. Thus, after executing this procedure, GetMainLeaves will determine and return, at 524, the identity of the main nodal leaves of the two-topology structure 510, which in this case are main nodes 512 and 516.

Next, having determined the identity of the main node leaves, the first identified main leaf is accessed and its corresponding object state information retrieved by making the procedure call GetRelevance( . . . ) at 526. GetRelevance( . . . ) often includes—as some of its parameters—the location of the first main leaf being accessed (e.g., a memory location on the memory module of the server 100), and the specified evaluation parameters or criteria used to evaluate the nodes that are to be accessed. Other parameters may also be specified in this procedure call. In this case, the GetRelevance call specifies main leaf 512 as the main leaf to be accessed and evaluated.

As noted, once a main node is accessed (for example, by invoking the GetRelevance procedure), the pertinent object state data is retrieved. Additionally, at this stage it may be determined if the node has any sub-nodes (this operation is not shown in relation to 526). With the data of the currently accessed main node having been retrieved, the relevancy of main node leaf 512 is computed at 528. For the purpose of illustration, in this particular example main node 512 is determined to be not relevant.

After the relevancy of main leaf 512 has been computed, and before the GetRelevance procedure can terminate, a determination is made as to whether the currently accessed node (namely, node 512) has a predecessor. Thus, the procedure GetPredecessor( ) is invoked, at 530, to make this determination. In the event that this invoked procedure finds a predecessor, it returns as a result the identity or location (e.g., memory location) of the predecessor node of the currently accessed node. In this case, however, node 512 does not have any predecessor main nodes, and therefore the GetPredecessor procedure returns a value, at 532, indicating that there is no predecessor. Subsequently, the currently executing GetRelevance procedure terminates, and a value indicating that no relevant node was found is returned at 534, as well as a value indicating that the node does not have a predecessor.

Next, because previously another main leaf had been identified (namely, main leaf 516), the GetRelevance procedure is again invoked at 540, this time specifying as its parameters the identity or location of main leaf node 516, as well as the evaluation parameters. Once main node 516 has been accessed and its data retrieved, a computation of that node's relevancy is made at 542. Once again, for the sake of illustration, in the example described herein node 516 is determined to be not relevant. Further, although not shown with respect to node 516, a procedure to determine if this node has any sub-nodes may have to be performed before computation of the node's relevancy (in this case, node 516 does not have any sub-nodes).

Next, before the GetRelevance procedure invoked with respect to node 516 can be completed, the GetPredecessor procedure is invoked at 544. This time, a predecessor is identified (namely, main node 514), and therefore the identity and/or location of this node is returned at 546. The GetRelevance procedure performed with respect to node 516 having been completed, an indication that node 516 is not relevant, as well as the identity of the predecessor of node 516, are returned at 548.

Next, the GetRelevance procedure is again invoked, at 560, this time using as one of its parameters the identity and/or location of main node 514 which had been identified as the predecessor of main node 516. The object state data for main node 516 is accessed and retrieved and the relevance computed at 562. As shown, in this case a procedure call GetSubLeaves( . . . ) is made at 564 to identify any sub-nodes extending from main node 514 (although not shown, a similar procedure could have also been made with respect to main nodes 512 and 516). As noted, sub-nodes hold current data for any of the node's modifiable parameters, and thus, this data may have a bearing on the relevancy of the main node being evaluated. In this case, a sub-node of main node 514 is identified (namely, sub-node 518), and thus at 566 the identity and/or location of that sub-node are returned. With the identity and/or location of the sub-node 518 having been determined, a nested GetRelevance procedure call is made, at 568, using the identity and/or location of the sub-node 518 as one of the parameters of the procedure call. The data of the sub-node 518 is subsequently retrieved and used to compute the relevancy of the sub-node and/or the associated main node at 570. Particularly, in some embodiments, the relevancy of the sub-node is first computed in 570. The result is sent back and overrides the relevancy of the main node. Thus, the relevancy computed at 570 is used as relevancy of node 514.

In some embodiments, evaluation of the main node may be deferred until the data corresponding to changes to the modifiable parameters, as held in the associated sub-nodes, is retrieved. In this case, the evaluation of node 514 and its associated sub-node 518 yields a result indicating that the node 514 is relevant. The GetRelevance procedure call that was made with respect to sub-node 518 is completed, and an indication of the relevancy of node 514 is returned at 572. Generally, a procedure to determine if there are any further predecessors to main node 514 may be performed at this point (not shown in FIG. 5 with respect to node 514). In this case, main node 514 does not have a predecessor, and accordingly, the GetRelevance procedure call made with respect to main node 514 is completed, and a value indicating the relevancy of main node 514, the parameter set corresponding to this main node (or, in some embodiments, the entire data of the object state), and an indication that node 514 does not have a predecessor are returned at 574. Because there are no additional main leaves (as was determined at 522), the illustrated portion of the Evaluate( . . . ) procedure is completed and the parameter set corresponding to main node 514 is returned at 576.

The preceding description illustrates various techniques, such as example method 400. System 100 contemplates using or implementing any suitable technique for performing these and other tasks. It will be understood that these methods are for illustration purposes only and that the described or similar techniques may be performed at any appropriate time, including concurrently, individually, or in combination. In addition, many of the steps in this flowchart may take place simultaneously and/or in different orders than as shown and need not take place at all. Moreover, system 100 may use methods with additional steps, fewer steps, and/or different steps, so long as the methods remain appropriate.

Although this disclosure has been described in terms of certain embodiments and generally associated methods, alterations and permutations of these embodiments and methods will be apparent to those skilled in the art. In some cases, the methods and systems described herein may be used, for example, in engineering change management processes to keep track of the historical evolution of products, and determine the state of the product at any given time (past, present and future). In addition, the methods and systems described herein enable mapping parameter changes of a state or a version along a defined sequence. In an engineering change management process, such methodology can be used to map changes of the temporal validity (e.g., valid-from dates) of a determined change state. In some embodiments, the methods and systems described herein may be used to serialize and track the sequence of object states within an inbound and outbound processing in a master data distribution process. Accordingly, the above description of example embodiments does not define or constrain this disclosure. Other changes, substitutions, and alterations are also possible without departing from the spirit and scope of this disclosure.

What is claimed is:

1. A computer-implemented method performed by one or more processors for organizing data in a two-topology configuration, the method comprising:

using a processor to provide a linked plurality of nodes, each node of at least a subset of the linked plurality of nodes including change data relating to a corresponding business object state of a business object, at least one node of the linked plurality of nodes linked to one or more associated linked sub-nodes that each comprise data relating to changes to one of a plurality of modifiable parameters of the corresponding business object state data such that all sub-nodes relating to a particular modifiable parameter of the corresponding business object state data are arranged along a corresponding single branch of linked sub-nodes linked to and extending from the associated node;

identifying a change to a particular modifiable parameter of a business object state;

generating a new sub-node in response to identifying the change to the particular modifiable parameter, the new sub-node comprising data relating to the change to the particular modifiable parameter of the business object state;

linking the new sub-node to a predecessor sub-node comprising data relating to a previous change to the particular modifiable parameter, the previous change occurring prior to the change to the particular modifiable parameter of the business object state;

populating the new sub-node with data defining a difference between a value associated with the particular modifiable parameter of the business object state at a time the predecessor sub-node was generated and a value associated with the particular modifiable parameter of the business object state at a time the new sub-node was generated; and determining an overall business object state corresponding with a particular node of the linked plurality of nodes by traversing both of at least the particular node to extract business object state change data and at least the new sub-node to extract change data associated with the particular modifiable parameter associated with the new sub-node.

2. The method of claim 1, wherein at least one sub-node of the one or more associated sub-nodes is linked to one predecessor element and at most to one successor sub-node.

3. The method of claim 2, wherein the one predecessor element includes one of:
   a predecessor node of the linked plurality of nodes, or
   a predecessor sub-node.

4. The method of claim 1, wherein the plurality of modifiable parameters includes at least one of:
   the date at which the business object state becomes valid; or
   an indication of whether a validation check performed on the business object state was successful.

5. The method of claim 1, wherein each leaf sub-node located at the far end of the corresponding branch comprises data relating to the most recent modification to the corresponding modifiable parameter of the corresponding business object state data.

6. The method of claim 1, further comprising:
   providing a set of one or more specified evaluation parameters; and
   determining the relevancy of at least some nodes of the linked plurality of nodes based, at least in part, on the set of the one or more specified evaluation parameters.

7. The method of claim 6, wherein determining the relevancy of at least some of the linked plurality of nodes comprises:
   at each node of the at least some nodes of the linked plurality of nodes linked to sub-nodes, accessing at least some of the sub-nodes arranged along the branches associated with the corresponding node; and
   evaluating the relevancy of the at least some nodes of the linked plurality of nodes linked to sub-nodes based, at least in part, on the set of the one or more specified evaluation parameters and on the data held in the accessed sub-nodes associated with the corresponding node.

8. The method of claim 6, wherein determining the relevancy of at least some of the linked plurality of nodes comprises, on a determination that the currently accessed node has a predecessor node linked to it, accessing the predecessor node.

9. A computer-implemented method performed by one or more processors for evaluating the relevancy of at least some of a linked plurality of nodes, the method comprising:
   providing a set of one or more specified evaluation parameters;
   using a processor to access each node of at least some of the linked plurality of nodes, each one of the accessed nodes including change data relating to a corresponding object state of an object and linked to one or more associated linked sub-nodes that each comprise data relating to a change to one of a plurality of modifiable parameters of the corresponding object state data such that all sub-nodes relating to a particular modifiable parameter of the corresponding object state data are arranged along a corresponding single branch of linked sub-nodes linked to and extending from the associated node, each sub-node of the linked sub-nodes in the corresponding single branch linked to a predecessor element comprising at least one of the associated node or a predecessor sub-node, wherein a particular sub-node of the linked sub-nodes is populated with data defining a difference between a value associated with the particular modifiable parameter of the corresponding object state data at a time the predecessor element was generated and a value associated with the particular modifiable parameter of the corresponding object state data at a time the particular one of the linked sub-nodes was generated;
   determining the relevancy of the at least some of the linked plurality of nodes based, at least in part, on the set of the one or more specified evaluation parameters; and
   determining an overall object state corresponding with a particular node of the linked plurality of nodes by traversing both of at least the particular node to extract object state change data and at least the particular sub-node to extract change data associated with the particular modifiable parameter associated with the particular sub-node.

10. The method of claim 9, wherein determining the relevancy of at least some nodes of the linked plurality of nodes comprises:
   at each node of the at least some nodes of the linked plurality of nodes linked to sub-nodes, accessing at least some of the sub-nodes arranged along the branches associated with the corresponding node; and
   evaluating the relevancy of the at least some nodes of the linked plurality of nodes linked to sub-nodes based, at least in part, on the set of the one or more specified evaluation parameters and on the data held in the accessed sub-nodes associated with the corresponding node.

11. A computer-program product residing on a non-transitory computer readable storage medium for organizing data in a two-topology configuration, comprising computer instructions that when executed on a processor-based device cause the processor-based device to:
   provide a linked plurality of nodes, each node of the linked plurality of nodes including change data relating to a corresponding object state of an object, each node of the linked plurality of nodes linked to one or more associated linked sub-nodes that each comprise data relating to changes to one of a plurality of modifiable parameters of the corresponding object state data such that all sub-nodes relating to a particular modifiable parameter of the corresponding object state data are arranged along a corresponding single branch of linked sub-nodes linked to and extending from the associated node;
   identify a change to a particular modifiable parameter of an object state;
   generate a new sub-node in response to identifying the change to the particular modifiable parameter, the new sub-node comprising data relating to the change to the particular modifiable parameter of the object state; and
   link the new sub-node to a predecessor sub-node comprising data relating to a previous change to the particular modifiable parameter, the previous change occurring prior to the change to the particular modifiable parameter of the object state;
   populate the new sub-node with data defining a difference between a value associated with the particular modifiable parameter of the object state at a time the predecessor sub-node was generated and a value associated with the particular modifiable parameter of the object state at a time the new sub-node was generated; and
   determine an overall object state corresponding with a particular node of the linked plurality of nodes by traversing both of at least the particular node to extract object state change data and at least the new sub-node to extract change data associated with the particular modifiable parameter associated with the new sub-node.

12. The computer-program product of claim 11, wherein every sub-node of the one or more associated sub-nodes is linked to one predecessor element and at most to one successor sub-node.

13. The computer-program product of claim 11, further comprising computer instructions that when executed on the processor-based device cause the processor-based device to:
provide a set of one or more specified evaluation parameters; and
determine the relevancy of at least some nodes of the linked plurality of nodes based, at least in part, on the set of the one or more specified evaluation parameters.

14. The computer-program product of claim 13, wherein the computer instructions that cause the processor-based device to determine the relevancy of at least some nodes of the linked plurality of nodes comprise computer instructions that when executed cause the processor-based device to, based on a determination that a currently accessed node has a predecessor node of the linked plurality of nodes linked to it, access the predecessor node.

15. The computer-program product of claim 13, wherein the computer instructions that cause the processor-based device to determine the relevancy of at least some nodes of the linked plurality of nodes comprise computer instructions that when executed cause the processor-based device to:
at each node of the at least some nodes of the plurality of nodes linked to sub-nodes, access at least some of the sub-nodes arranged along the branches associated with the corresponding node; and
evaluate the relevancy of the at least some nodes of the linked plurality of nodes linked to sub-nodes based, at least in part, on the set of the one or more specified evaluation parameters and on the data held in the accessed sub-nodes associated with the corresponding node.

16. A server comprising:
a processor electronically connected to a memory module, the memory module storing computer instructions that when executed on the processor cause the processor to:
provide a linked plurality of nodes, each node of the linked plurality of nodes including change data relating to a corresponding object state of an object, each node of the linked plurality of nodes linked to one or more associated linked sub-nodes that each comprise data relating to changes to one of a plurality of modifiable parameters of the corresponding object state data such that all sub-nodes relating to a particular modifiable parameter of the corresponding object state data are arranged along a corresponding single branch of linked sub-nodes linked to and extending from the associated node;
identify a change to a particular modifiable parameter of a business object state;
generate a new sub-node in response to identifying the change to the particular modifiable parameter, the new sub-node comprising data relating to the change to the particular modifiable parameter of the business object state; and
link the new sub-node to a predecessor sub-node comprising data relating to a previous change to the particular modifiable parameter, the previous change occurring prior to the change to the particular modifiable parameter of the business object state;
populate the new sub-node with data defining a difference between a value associated with the particular modifiable parameter of the business object state at a time the predecessor sub-node was generated and a value associated with the particular modifiable parameter of the business object state at a time the new sub-node was generated; and
determining an overall object state corresponding with a particular node of the linked plurality of nodes by traversing both of at least the particular node to extract object state change data and at least the new sub-node to extract change data associated with the particular modifiable parameter associated with the new sub-node.

17. The server of claim 16, wherein every sub-node of the one or more associated sub-nodes is linked to one predecessor element and at most to one successor sub-node.

18. The server of claim 16, wherein the computer instructions stored on the memory module further comprise computer instructions that when executed on the processor cause the processor to:
provide a set of one or more specified evaluation parameters; and
determine the relevancy of at least some nodes of the linked plurality of nodes based, at least in part, on the set of the one or more specified evaluation parameters.

19. The server of claim 18, wherein the computer instructions that cause the processor-based device to determine the relevancy of at least some nodes of the linked plurality of nodes comprise computer instructions that when executed cause the processor-based device to, based on a determination that a currently accessed node has a predecessor node linked to it, access the predecessor node.

20. The server of claim 18, wherein the computer instructions that cause the processor-based device to determine the relevancy of at least some nodes of the linked plurality of nodes comprise computer instructions that, when executed, cause the processor-based device to:
at each node of the at least some nodes of the linked plurality of nodes linked to sub-nodes, access at least some of the sub-nodes arranged along the branches associated with the corresponding node; and
evaluate the relevancy of the at least some nodes of the linked plurality of nodes linked to sub-nodes based, at least in part, on the set of the one or more specified evaluation parameters and on the data held in the accessed sub-nodes associated with the corresponding node.

* * * * *